US008928920B2

(12) United States Patent
Bell et al.

(10) Patent No.: US 8,928,920 B2
(45) Date of Patent: Jan. 6, 2015

(54) MULTI-COLOR BANNER PAGES FOR PRINT JOB FINISHING WORKFLOWS

(71) Applicant: Xerox Corporation, Norwalk, CT (US)

(72) Inventors: Daniel Bell, Rochester, NY (US); Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/864,678

(22) Filed: Apr. 17, 2013

(65) Prior Publication Data

US 2014/0313540 A1    Oct. 23, 2014

(51) Int. Cl.
*G06F 3/12* (2006.01)
*G06K 15/02* (2006.01)

(52) U.S. Cl.
CPC ................. *G06K 15/1807* (2013.01)
USPC ......... 358/1.15; 715/231; 715/253; 358/1.13; 358/1.16

(58) Field of Classification Search
CPC ... G06F 3/1205; G06F 3/1208; G06F 3/1241; G06F 3/1243; G06F 3/1285; G06F 3/126; G06K 2215/011; G06K 15/1803; G06K 15/1822
USPC .............................. 358/1.12, 1.15
See application file for complete search history.

(56) References Cited

U.S. PATENT DOCUMENTS

| | | | |
|---|---|---|---|
| 5,465,167 A | 11/1995 | Cooper et al. | |
| 6,032,004 A | 2/2000 | Mirabella, Jr. et al. | |
| 6,075,617 A * | 6/2000 | Fischer et al. | 358/1.13 |
| 6,224,048 B1 | 5/2001 | Motamed | |
| 6,568,668 B1 | 5/2003 | Wakabayashi et al. | |
| 7,313,340 B2 | 12/2007 | Savitzky et al. | |
| 7,580,164 B2 | 8/2009 | Barrus et al. | |
| 7,703,002 B2 | 4/2010 | Barrus et al. | |
| 7,894,739 B2 | 2/2011 | Gramowski et al. | |
| 2009/0279114 A1 * | 11/2009 | Sakurai | 358/1.12 |
| 2011/0116122 A1 * | 5/2011 | Jessen et al. | 358/1.15 |
| 2012/0200885 A1 * | 8/2012 | Matsuzawa | 358/1.15 |
| 2013/0222819 A1 * | 8/2013 | Johnson et al. | 358/1.6 |

* cited by examiner

*Primary Examiner* — Benny Q Tieu
*Assistant Examiner* — Juan M Guillermety
(74) *Attorney, Agent, or Firm* — Gibb & Riley, LLC

(57) ABSTRACT

A print job includes instructions to print markings and perform finishing operations on a first type of media. Systems and methods determine print job characteristics of the print job based on data within the print job, and select a different type of media on which banner pages will be printed (e.g., "second types of media" that is different from the first type of media used for the print job pages). The banner pages contain human and/or computer readable instructions to perform the finishing operations. The media type used for the "second type of media" is based on the print job characteristics of the print job. The print markings are printed on the first type of media, and the banner pages are printed on the second type of media.

16 Claims, 4 Drawing Sheets

MULTI-COLOR BANNER PAGES FOR PRINT JOB FINISHING WORKFLOWS

BACKGROUND

Systems and methods herein generally relate to printing systems, and more particularly to systems that use one device to perform printing, and other devices to perform finishing operations (and that use banner sheets to track print jobs as they move between processing stations so as to promote the workflow between such devices).

Print shops have several production process steps that are applied to print jobs. These include printing, finishing, kitting, shipping, etc. These processes may be separated in location and/or time, and the intermediate job output should be accurately tracked as it moves between processing stations. In addition, job-specific handling and processing instructions may be specified for each job and should be accurately associated with the associated job output. If job output is misidentified between processing steps or job-specific instructions are misapplied, the result may be incorrect product output or an incorrect shipping destination. Highly effective systems accurately identify the job output between the different processing steps and ensure that correct instructions are associated with each job.

Further, current systems allow print shops to use document creation or workflow applications to create their own customized auxiliary production sheets to be printed with each print job. These sheets contain shop-specific job identification information as text, bar codes, or other graphical objects. The job identification information can be read by humans or optical devices, such as bar code scanners, to allow for reliable identification of the job. Job attributes submitted with the job instruct the digital printing press to automatically process a specified number of leading pages of the document as production job sheets (exception pages or sheets) instead of as part of the finished product. Page exception programming can be manually or automatically applied to easily distinguish banner pages based on job characteristics such as post-print processing steps, scheduling, and destination.

SUMMARY

Exemplary methods herein receive a print job into a computerized device. The print job includes instructions to print markings and perform finishing operations on a first type of media. Such methods determine characteristics of the print job using the computerized device based on data within the print job (such data can include, for example, print job origination, print job destination, print job urgency, print job required completion time, post-printing processing steps, etc.).

When determining the print job characteristics of the print job, such methods can determine: whether the finishing operations will be performed internally by a finishing device that is maintained within the printing device (meaning no external finishing operations are necessary); whether multiple stages of the finishing operations are required by the print job; whether the print job comprises a priority or rush print job; physical routing requirements to perform the finishing operations; etc.

Also, such methods prepare one or more banner pages (sometimes called coversheets or routing sheets) using the computerized device. The banner pages contain human and/or computer readable instructions to perform the finishing operations. Further, the methods also select from different types of media on which the banner pages will be printed (e.g., "second types of media" that are different from the first type of media used for the print job pages). The different types of media can be different color media, different sized or shaped media, different weight or thickness media, etc. The process of selecting the second type of media selects the second type of media from a plurality of different types of media (all of which are different from the first type of media, and are generally maintained in other paper trays from the first type of media used for the print job itself).

The second types of media used for the banner pages of a single print job can also be different from each other (if, for example, multiple banner pages are printed). Thus, two or more banner sheets (each being of a different type) can be printed for, and placed on, a single stack of a single print job.

The choice of which media type to use for the "second type of media" is based on the print job characteristics of the print job. Thus, when selecting the second type of media to be used for the banner sheet(s), such methods select from the types of media differently depending upon the print job characteristics into which the print job has been characterized.

Then, these methods cause a printing device to print the print job markings on the first type of media, and print the banner information markings on the second type(s) of media. More specifically, these methods cause the printing device to output the banner page on top of the first type of media after the print job markings are printed on the first type of media. Further, such methods can cause the printing device to number the banner pages using a different numbering scheme than used on the first type of media (allowing such banner sheets to more easily be excluded from the finishing processing).

Computerized devices herein include (among other components) an input/output device operatively connected to a processor device. The input/output device receives a print job, and the print job includes instructions to print markings and perform finishing operations on a first type of media. The processor determines characteristics of the print job based on data within the print job. Again, the data within the print job comprises print job origination, print job destination, print job urgency, print job required completion time, post-printing processing steps, etc.

The processor prepares one or more banner pages using the computerized device. Again, the banner pages comprise instructions to perform the finishing operations. The processor selects second types of media on which the banner pages will be printed. As discussed above, the second types of media are different from each other and from the first type of media, and are selected based on the print job characteristics of the print job. The processor causes a printing device to print the markings on the first type of media, and the banner pages on the second types of media.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
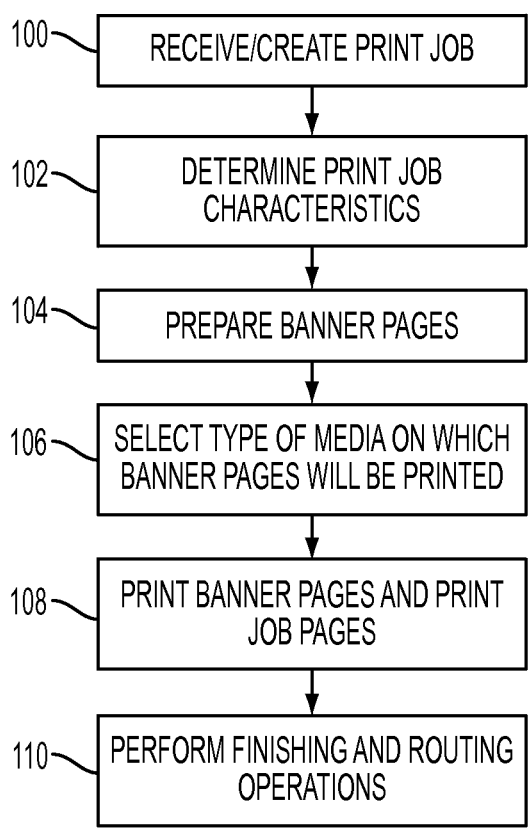
FIG. 1 is a flow diagram of various methods herein.

As mentioned above, print shops can use standard document creation or print workflow applications to create their own completely custom banner pages (sometimes called production sheets) for each different print job. These custom banner pages can include text, bar codes, or other graphical content to identify the print job throughout the print shop and to provide instructions for print job handling and processing at each station. The content of these banner pages can be determined by the print shop and customized based on the specific workflow and job tracking processes for that shop.

Such banner pages are added to the electronic document to be printed, submitted to the digital printer, printed with the print job, and output on the top of the stack of sheets produced by the device performing the printing operations. The submission includes a job exception attribute indicating that the digital printing should treat the specified number of banner pages in the same manner as traditional system-generated exception pages. For example, the media for the banner pages will be inherited from the printer's standard exception page media (instead of the job media). The exception programming will restrict the printing of banner pages such that only one copy of each of the banner pages will be printed, no imposition or finishing will be applied to the banner pages, and the print/delivery order will be the same as the standard system-generated exception pages.

The systems and methods herein define custom media ticketing for custom banner pages. The custom media ticketing can be used to provide quick and easy visual indication of post-printing job production instructions. The systems and methods herein distinguish jobs based on origination, destination, urgency, required completion time, post-printing processing steps, or other production characteristics.

For example, with respect to scheduling, high-priority "rush" jobs can be programmed to print red banner pages with systems and methods herein. Operators can then easily and quickly recognize that those jobs need to be moved to the next processing step (e.g., off-line finishing) immediately. In another example, jobs with normal priority can be printed with yellow banner pages, indicating normal scheduling. Further, with respect to post-printing processing steps, with systems and methods herein, all jobs requiring off-line binding can be identified by blue banner sheets. Operators can then easily group the output of all jobs requiring the same type of off-line finishing together.

Additionally, with respect to multiple post-print process steps, with systems and methods herein a job can be printed with multiple banner pages, each targeting a different post-printing production step, and each potentially having a different color. For example, the top sheet can be printed on red stock with instructions for the bindery operator, a second sheet can be printed on yellow stock with instructions for the kitting operatory, and a third sheet can be printed on green stock with instructions for the loading dock operator.

Further, while the previous examples mention that different color banner sheets can be utilized, the systems and methods herein can more generically use different "types" of banner sheets. These different "types" of banner sheets can be different color banner sheets, different size banners sheets, different thickness banner sheets, specialty type stock, etc. Therefore, one exemplary "type" of banner sheet can be a self-adhesive label stock used for addressing labels. Thus, with systems and methods herein, a specific type of banner sheet can be used to create shipping labels, for example.

Thus, the systems and methods herein can specify that different types of media are to be used as exception processing sheets for custom banner pages. In one example, a single page range can be used for the entire job (e.g., with 2 leading banner pages, specify page 1 on red paper and page 2 on yellow paper). In another example, alternate page range notation can be used to distinguish the banner pages from the pages of the print job (e.g., negative numbers, or an alternate notation such as roman numerals can be used for the leading banner pages to distinguish the banner pages from the pages of the print job).

Additionally, the systems and methods herein can dynamically and automatically assign which type of banner media to use based on job metadata or job characteristics. Such metadata can be automatically or manually inserted into the print job during upstream print job construction. Job characteristics that determine which type of banner media is used can be, for example, whether offline binding will be performed, etc.

The generation and banner media-type assignment of custom banner pages may be done in a single stage (all banner pages can be generated in a single operation) or multiple stages. Therefore, with systems and methods herein, an upstream system may compose leading banner pages in multiple operations, where one operation generates leading banner pages targeted for the bindery, another operation generates leading banner pages for the kitting and packing operations, and another operation generates leading banner pages for the shipping operations.

With the systems and methods herein more than one type of printing media (e.g., printing stock) for banner pages can be used, contextual job metadata from content creation can be used for automatic banner page media selection, banner pages from multiple processes can be concatenated, automatic banner page media selection can be made based on job status, etc.

FIG. 1 is flowchart illustrating exemplary methods and begins in item 100 where these exemplary methods receive a print job into, or create, a print job using a computerized device. The print job includes instructions to print markings and perform finishing operations on a first type of media. Further, the print job may include metadata that has been inserted into the print job during print job construction.

As shown in item 102, such methods can also analyze the print job to determine characteristics of the print job using the computerized device to dynamically assign which type of media sheets to use for the banner pages. The determination of the print job characteristics can be based on any job metadata (which can specifically identify the media type for the banner pages) that may be included in the print job. In addition (or alternatively) the print job characteristics can be based on data within the print job.

Such print job data within the print job can include, for example print job origination information, which can include for example, the type of device that originated the print job, the characteristics of the customer that originated the print job (priority customer, contractual customer for which a quality of service level (QoS) must be maintained, large volume customer, etc.). Additionally, such print job data can include the geographic region of the customer generating the print job, the print job destination, the print job urgency, the print job required completion time, as well as a listing of all the post-printing processing steps in the workflow mandated by the print job.

When determining the print job characteristics in item 102, such methods can determine: whether the finishing operations will be performed internally by a finishing device that is maintained within the printing device (meaning no external finishing operations are necessary); whether multiple stages of the finishing operations are required by the print job workflow; whether the print job comprises a priority or rush print job; physical routing requirements to perform the finishing operations; etc.

Also, such methods prepare electronic versions of one or more banner pages (sometimes called coversheets or routing sheets) using the computerized device in item 104. The banner pages contain human and/or computer readable instructions to perform the finishing operations (including delivery operations). Therefore, the banner pages instruct the print shop devices and print shop personnel where the printed stacks of media should be routed, what post-printing processing should occur to such printed stacks of media, a specific order of workflow operations, etc.

As shown in item 106, these methods also select the type of media on which the banner pages will be printed (sometimes referred to herein as "second types of media" that are different from the "first type of media" used for the print job pages). The different "types" of media can be different color media, different sized or shaped media, different weight media, different thickness media, specialized media (e.g., label media, preprinted forms, etc.), etc. This selecting process 106 selects the second type of media from a plurality of different types of media, all of which are different and distinguishable from the first type of media, and are generally maintained in other paper trays from the first type of media used for the print job itself. As mentioned above, the second types of media used for the banner pages of a single print job can also be different from each other (if, for example, multiple banner pages are to be included on a single stack of printed sheets). Thus, two or more banner sheets (each being of a different type) can be printed for, and placed on, a single stack of printed media of a single print job.

The choice of which media type to use for the "second type of media" in item 106 is based on the print job characteristics determined in item 102. Thus, when selecting the second type of media to be used for the banner sheet(s), such methods select from the types of media differently depending upon the print job characteristics into which the print job has been characterized.

Then, as shown in item 108, these methods cause a printing device to print the markings on the first type of media, and the banner pages on the second type(s) of media. More specifically, these methods cause the printing device to output the banner page on top of the first type of media after the print job markings are printed on the first type of media. Further, as mentioned above in item 108, such methods can cause the printing device to number the banner pages using a different numbering scheme than used on the first type of media (allowing such banner sheets to more easily be excluded from the finishing processing). The various finishing and routing operations are then performed according to the instructions maintained within the banner pages in item 110.

Figure 2:
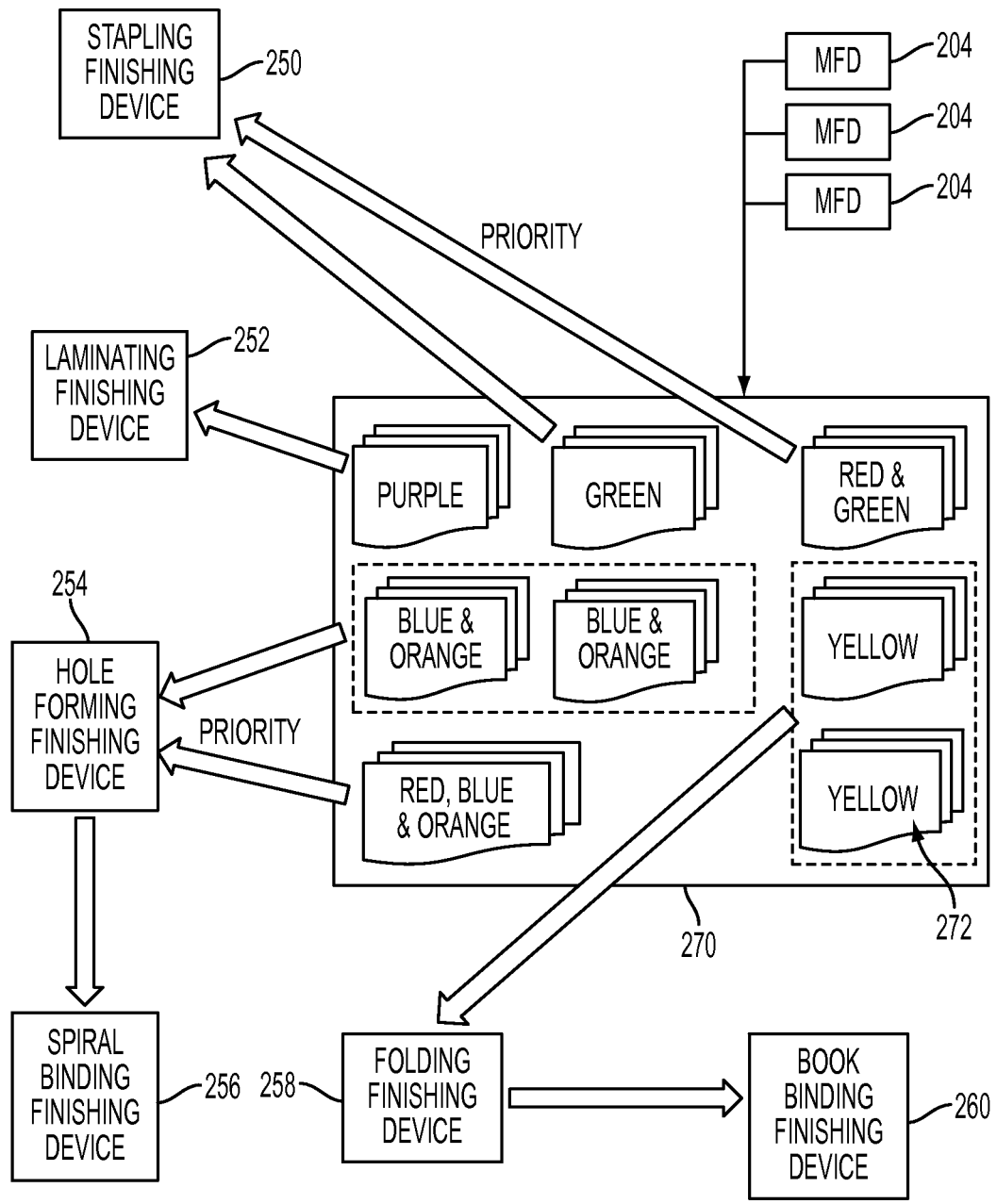
FIG. 2 is a schematic diagram illustrating of operations of various methods and systems for herein.

FIG. 2 is a schematic diagram illustrating the operations of various systems and methods herein. Items 204 represent any form of printing device. In FIG. 2, the printing devices 204 are labeled multi-function devices (MFD); however, as would be understood by those ordinarily skilled in the art, the printing devices 204 can comprise any form of printing device, including offset printing devices, digital printing devices, inkjet printing devices, solid ink printing devices, electrostatic printing devices, etc.

As discussed in greater detail below, other devices can provide print jobs to the printing devices 204 to cause the printing devices 204 to produce rolls or stacks of printed media 272 which are then output from the printing devices 204 to an area labeled 270 in FIG. 2. As would be understood by those ordinarily skilled in the art, different printing devices can actually output to different physical areas; however, area 270 is used to generically represent all areas where printed media may be output or be accumulated before distribution.

The printed media 272 is shown as having banner sheets in FIG. 2, and the colors indicated on the printed media stacks 272 indicates the color or colors of the banner sheets. In FIG. 2, if multiple colors are shown on a printed media stack 272, this indicates that multiple banner sheets are included on the printed media stack 272, and that the multiple banner sheets on a given printed media stack 272 are of different types (one example of which is color types). While colors are used in the example in FIG. 2 to indicate different types of banner media, those ordinarily skilled in the art would understand that the banner sheets could potentially have the same color, but different sizes, different shapes, be of specific media types (label sheets, preprinted forms, etc.) and color in this example represents all such different media "types." Therefore, FIG. 2 uses different colors to generically represent the different types of media that could be utilized for the banner sheets.

Further, various arrows (representing sheet stack routing) are shown as extending from area 270 to different devices including a stapler finishing device 250, a laminating finishing device 252, a hole forming finishing device 254, a spiral binding finishing device 256, a folding finishing device 258, and a book binder finishing device 260. As would be understood by those ordinarily skilled in the art, these finishing devices are only exemplary and many other types of finishing devices could be utilized with systems and methods herein. Further, only a single finishing device of each type is illustrated in FIG. 2; however, each device shown in FIG. 2 represents multiple such finishing devices (potentially at different locations).

The arrows extending from area 270 indicate a processing workflow (or physical delivery) path for each of the different printed media stacks 272, which is controlled by the banner sheets. Such routing can be performed manually and/or automatically (if an automated routing system is present within the print shop). In the example shown in FIG. 2, a printed media stack with a green banner sheet will be routed to the stapler finishing device 250, while the printed media stack with a purple banner sheet will be routed to the laminating finishing device 252. This demonstrates one element of the systems and methods herein, which allow print shop workers to immediately recognize the proper destination of a given printed media stack 272, so that the worker can properly route the stack (or recognize that an automated routing system is improperly delivering a printed media stack 272).

In an additional example, the printed media stack that includes both a red banner sheet and a green banner sheet (in the upper right-hand corner of area 270) will be routed to the stapler finishing device 250 (because of the green banner sheet); however, because a red banner sheet is also included on top of the media stack, this media stack will receive priority over the media stack immediately to the left (and this is also indicated by the word "priority" above the arrow). In this example, a red banner sheet indicates that a printed media stack has priority. A similar situation is illustrated in the lower left-hand corner of area 270, where a red banner sheet is added to a media stack having a blue banner sheet and an orange banner sheet to give the printed media stack with the red banner sheet priority over the printed media stacks that only include a blue banner sheet and an orange banner sheet.

FIG. 2 also illustrates that single banner sheets (yellow banner sheets) can cause multiple processing steps (workflow processing through the folding fishing device 258 and subsequent processing through book binder finishing device 260); and that multiple banner sheets (a blue banner sheet and an orange banner sheet) can be used to route a printed media stack 272 through multiple workflow processing steps (hole forming finishing device 254, followed by spiral binding finishing device 256).

Thus, as shown above, the systems and methods herein dynamically change the type (color representing the type in FIG. 2) of media used for banner sheets to help properly route printed media stacks, and to assist in the finishing operations of the various print jobs. As mentioned above, the banner sheets are subjected to exception processing and are not generally processed through the various finishing devices shown in FIG. 2.

Figure 3:
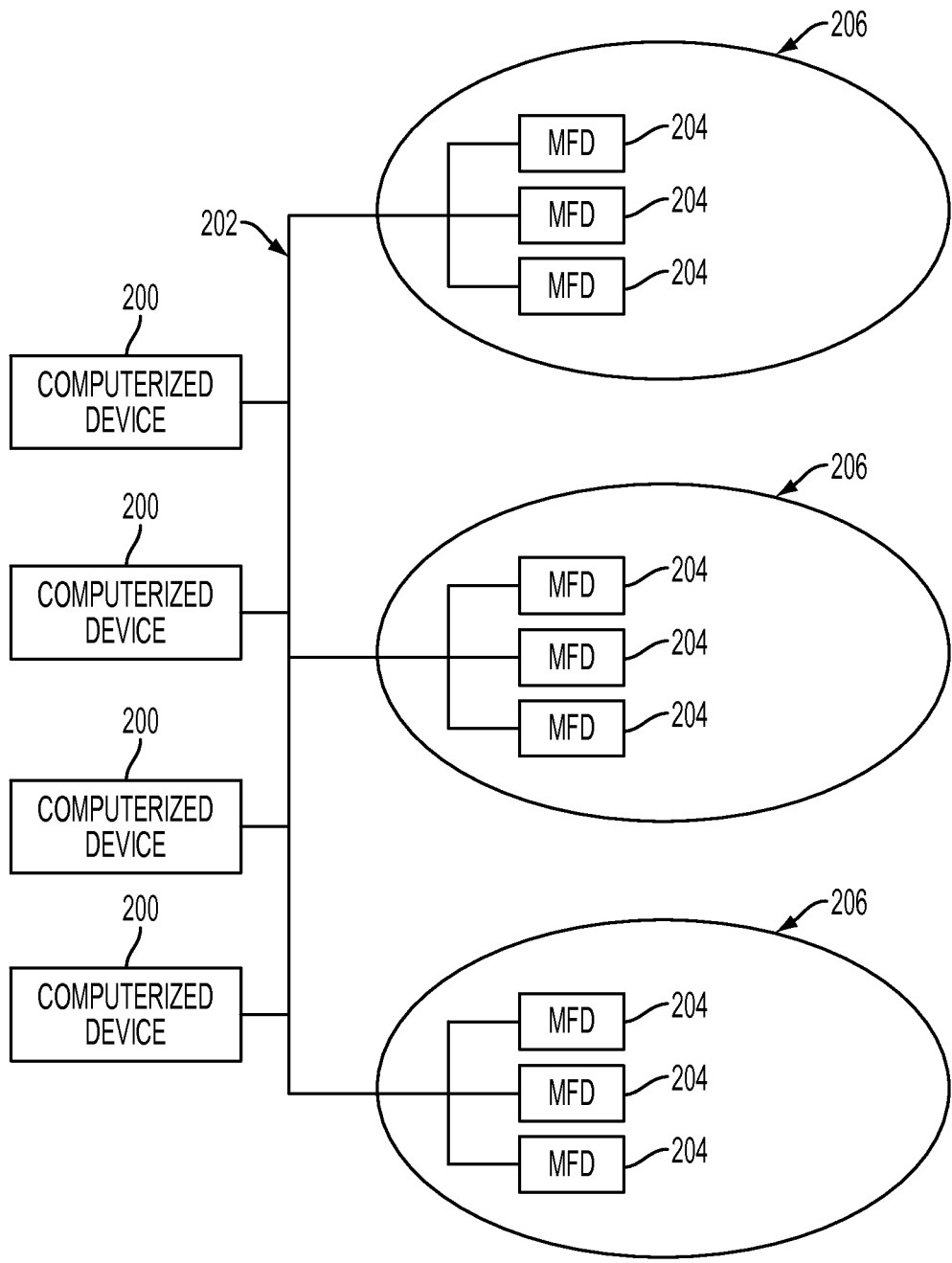
FIG. 3 is a schematic diagram illustrating systems herein.

As shown in FIG. 3, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202. Therefore, for example, devices 200 can send print jobs to printing devices 204, and either of the computerized devices scan perform the various processing shown in FIG. 1.

Figure 4:
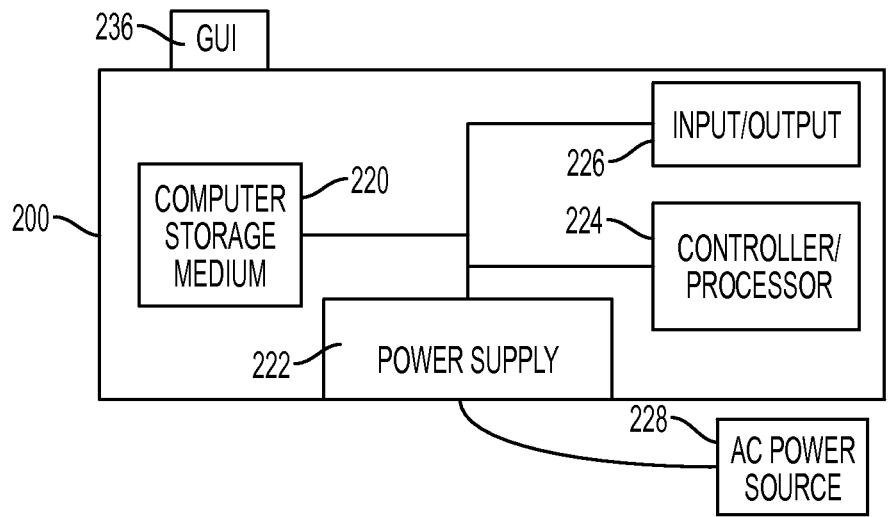
FIG. 4 is a schematic diagram illustrating devices herein.

FIG. 4 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 5:
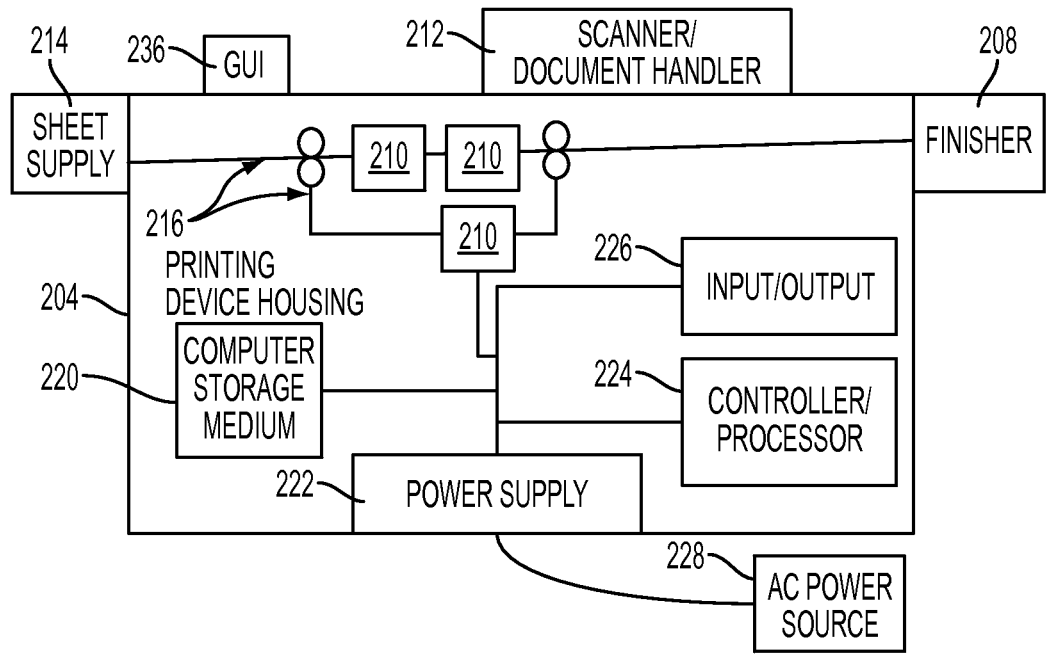
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, the various computerized device 200, 204 herein include (among other components) an input/output device 226 operatively connected to a processor device 224. The input/output device 226 receives a print job, and the print job includes instructions to print markings and perform finishing operations on a first type of media. The processor 224 determines characteristics of the print job based on data within the print job. Again, the data within the print job comprises print job origination, print job destination, print job urgency, print job required completion time, post-printing processing steps, etc.

The processor 224 prepares one or more banner pages using the computerized device. Again, the banner pages comprise instructions to perform the finishing operations. The processor 224 selects second types of media on which the banner pages will be printed. As discussed above, the second types of media are different from each other and from the first type of media and are selected based on the print job characteristics of the print job. The processor 224 causes a printing device 210 to print the markings on the first type of media, and the banner pages on the second types of media.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
receiving a print job into a computerized device, said print job including instructions to print markings and perform finishing operations on a first type of media;
determining print job characteristics of said print job using said computerized device,
said determining said print job characteristics comprising: determining whether said finishing operations will be performed by finishing devices maintained within a printing device; determining whether multiple stages of said finishing operations are required by said print job; determining whether said print job comprises a priority print job; and determining physical routing requirements to perform said finishing operations;
preparing at least one banner page using said computerized device, said banner page comprising instructions to perform said finishing operations;
automatically selecting a second type of media on which said banner page will be printed, said second type of media being different from said first type of media in at least one of media color, media size, and media weight, and said second type of media being automatically selected based on said print job characteristics; and
causing said printing device to print said markings on said first type of media and said banner page on said second type of media.

2. The method according to claim 1, said selecting said second type of media comprising selecting said second type of media from a plurality of different types of media that are different from said first type of media.

3. The method according to claim 2, said selecting said second type of media comprising selecting from said types of media differently depending upon said print job characteristics.

4. The method according to claim 1, said causing said printing device to print comprising:
causing said printing device to output said banner page on top of said first type of media after said markings are printed on said first type of media; and
causing said printing device to number said banner page using a different numbering scheme than used on said first type of media.

5. A method comprising:
receiving a print job into a computerized device, said print job including instructions to print markings and perform finishing operations on a first type of media;
determining print job characteristics of said print job using said computerized device based on data within said print job,
said determining said print job characteristics comprising: determining whether said finishing operations will be performed by finishing device is maintained within a printing device; determining whether multiple stages of said finishing operations are required by said print job; determining whether said print job comprises a priority print job; and determining physical routing requirements to perform said finishing operations; said data comprising print job origination, print job destination, print job urgency, print job required completion time, post-printing processing steps, and metadata within said print job;
preparing at least two banner pages using said computerized device, said banner pages comprising instructions to perform said finishing operations;
automatically selecting second types of media on which said banner pages will be printed, said second types of media being different from each other and from said first type of media in at least one of media color, media size, and media weight, and said second types of media being automatically selected based on said print job characteristics; and
causing said printing device to print said markings on said first type of media and said banner pages on said second types of media.

6. The method according to claim 5, said selecting said second type of media comprising selecting said second type of media from a plurality of different types of media that are different from said first type of media.

7. The method according to claim 6, said selecting said second type of media comprising selecting from said types of media differently depending upon said print job characteristics.

8. The method according to claim 5, said causing said printing device to print comprising:
causing said printing device to output said banner page on top of said first type of media after said markings are printed on said first type of media; and
causing said printing device to number said banner pages using a different numbering scheme than used on said first type of media.

9. A computerized device comprising:
a processor device; and
an input/output device operatively connected to said processor device,
said input/output device receiving a print job,
said print job including instructions to print markings and perform finishing operations on a first type of media, said processor device determining print job characteristics of said print job,
said processor device determining said print job characteristics comprising: said processor device determining whether said finishing operations will be performed by finishing device is maintained within a printing device; said processor device determining whether multiple stages of said finishing operations are required by said print job; said processor device determining whether said print job comprises a priority print job; and said processor device determining physical routing requirements to perform said finishing operations;
said processor device automatically preparing at least one banner page, said banner page comprising instructions to perform said finishing operations,
said processor device automatically selecting a second type of media on which said banner pages will be printed, said second type of media being different from said first type of media in at least one of media color, media size, and media weight, and said second type of media being automatically selected based on said print job characteristics, and
said processor device causing said printing device to print said markings on said first type of media and said banner page on said second type of media.

10. The computerized device according to claim 9, said processor device selecting said second type of media comprising said processor device selecting said second type of media from a plurality of different types of media that are different from said first type of media.

11. The computerized device according to claim 10, said processor device selecting said second type of media comprising said processor device selecting from said types of media differently depending upon said print job characteristics.

12. The computerized device according to claim 9, said processor causing said printing device to print comprising:

said processor causing said printing device to output said banner page on top of said first type of media after said markings are printed on said first type of media; and said processor causing said printing device to number said banner pages using a different numbering scheme than used on said first type of media.

13. A computerized device comprising:

a processor device;

and an input/output device operatively connected to said processor device, said input/output device receiving a print job, said print job including instructions to print markings and perform finishing operations on a first type of media, said processor device determining print job characteristics of said print job based on data within said print job, said processor device determining said print job characteristics comprising: said processor device determining whether said finishing operations will be performed by finishing device is maintained within a printing device; said processor device determining whether multiple stages of said finishing operations are required by said print job; said processor device determining whether said print job comprises a priority print job; and said processor device determining physical routing requirements to perform said finishing operations; said data within said print job comprising print job origination, print job destination, print job urgency, print job required completion time, post-printing processing steps, and metadata within said print job, said processor device automatically preparing at least two banner pages, said banner pages comprising instructions to perform said finishing operations, said processor device selecting second types of media on which said banner pages will be printed, said second types of media being different from each other and from said first type of media in at least one of media color, media size, and media weight, and said second types of media being selected based on said print job characteristics, and said processor device causing said printing device to print said markings on said first type of media and said banner pages on said second types of media.

14. The computerized device according to claim 13, said processor device selecting said second type of media comprising said processor device selecting said second type of media from a plurality of different types of media that are different from said first type of media.

15. The computerized device according to claim 14, said processor device selecting said second type of media comprising said processor device selecting from said types of media differently depending upon said print job characteristics.

16. The computerized device according to claim 13, said processor device causing said printing device to print comprising:

said processor device causing said printing device to output said banner page on top of said first type of media after said markings are printed on said first type of media; and said processor device causing said printing device to number said banner pages using a different numbering scheme than used on said first type of media.

* * * * *